(12) United States Patent
Religa et al.

(10) Patent No.: US 12,498,946 B2
(45) Date of Patent: Dec. 16, 2025

(54) METHOD AND SYSTEM OF AUTOMATICALLY GENERATING HELP DOCUMENTATION

(71) Applicant: Microsoft Technology Licensing, LLC, Redmond, WA (US)

(72) Inventors: Tomasz Lukasz Religa, Seattle, WA (US); Max Wang, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 196 days.

(21) Appl. No.: 18/524,630

(22) Filed: Nov. 30, 2023

(65) Prior Publication Data

US 2025/0181368 A1    Jun. 5, 2025

(51) Int. Cl.
*G06F 9/451* (2018.01)
*G06F 40/20* (2020.01)

(52) U.S. Cl.
CPC ............. *G06F 9/453* (2018.02); *G06F 40/20* (2020.01)

(58) Field of Classification Search
CPC ................................ G06F 9/453; G06F 40/20
See application file for complete search history.

(56) References Cited

U.S. PATENT DOCUMENTS

| | | |
|---|---|---|
| 6,684,369 B1 | 1/2004 | Bernardo et al. |
| 6,788,313 B1 | 9/2004 | Heil |
| 7,024,658 B1 | 4/2006 | Cohen et al. |
| 7,770,123 B1 | 8/2010 | Meyer et al. |
| 8,977,958 B2 | 3/2015 | Deyo et al. |
| 9,003,281 B2 | 4/2015 | Hashimoto |

(Continued)

FOREIGN PATENT DOCUMENTS

| | | |
|---|---|---|
| AU | 2009213059 B2 | 3/2010 |
| CN | 1869973 A | 11/2006 |

(Continued)

OTHER PUBLICATIONS

Zhong, Mingyuan, et al, "HelpViz: Automatic Generation of Contextual Visual Mobile Tutorials from Text-Based Instructions", 210803356arXiv.org, Aug. 6, 2021, pp. 1-10 (Year: 2021).*

(Continued)

*Primary Examiner* — Laurie A Ries
(74) *Attorney, Agent, or Firm* — Han Gim; Newport IP, LLC

(57) ABSTRACT

A system and method for automatically generating help content for a functionality of an application includes examining application data and a user query identifying the functionality and generating a prompt for submission to an artificial intelligence (AI) model based on the application data and the user query. An automatically generated help article on how to perform the functionality is then generated by the AI model. The automatically generated help article is simulated in the application by executing each step of the help article in the application via an executor, determining a current state of the application after each step is executed, determining that a next step of the help article can be executed in the current state of the application, executing the next step of the automatically generated help article via the executor; and continuing with determining the current state of the application after the next step is executed, determining that the next step of the help article can be executed in the current state of the application and executing the next step of the help article until each step of the help article is executed or an error occurs to validate the help article.

20 Claims, 10 Drawing Sheets

(56) References Cited

U.S. PATENT DOCUMENTS

| | | | |
|---|---|---|---|
| 9,690,444 B1* | 6/2017 | Joyce | G06F 3/0481 |
| 9,811,583 B2* | 11/2017 | Chilana | G06F 16/24575 |
| 10,534,690 B1 | 1/2020 | Russell | |
| 10,628,470 B2 | 4/2020 | Mcfarlane et al. | |
| 11,726,803 B2* | 8/2023 | Bradfield | G06N 20/00 |
| | | | 715/705 |
| 11,934,852 B1 | 3/2024 | Hannila | G06F 16/3322 |
| 2010/0146483 A1 | 6/2010 | Vaysman et al. | |
| 2011/0271185 A1* | 11/2011 | Chen | G06F 3/0481 |
| | | | 715/708 |
| 2011/0307780 A1* | 12/2011 | Harris | G06F 9/453 |
| | | | 715/708 |
| 2015/0067645 A1* | 3/2015 | Jhoney | G06F 9/453 |
| | | | 717/123 |
| 2017/0017903 A1 | 1/2017 | Gray et al. | |
| 2017/0061548 A1 | 3/2017 | Roebuck et al. | |
| 2017/0269945 A1* | 9/2017 | Patel | G06F 9/453 |
| 2018/0321807 A1* | 11/2018 | Ward | G06F 8/34 |
| 2019/0324778 A1 | 10/2019 | Bhowmick et al. | |
| 2019/0340004 A1 | 11/2019 | Garay et al. | |
| 2021/0026662 A1 | 1/2021 | Kotikalapudi | |
| 2021/0133195 A1 | 5/2021 | Jiang | |
| 2021/0382925 A1* | 12/2021 | Fincun | G06F 40/35 |
| 2022/0036370 A1 | 2/2022 | Rodman et al. | |
| 2022/0084058 A1 | 3/2022 | Podgorny et al. | |
| 2023/0376284 A1* | 11/2023 | Shi | G06F 8/10 |
| 2023/0393871 A1 | 12/2023 | Religa et al. | |

FOREIGN PATENT DOCUMENTS

| | | | |
|---|---|---|---|
| CN | 102855141 A | 1/2013 | |
| WO | WO-2019014066 A1 * | 1/2019 | G06Q 30/016 |
| WO | WO-2019078814 A1 * | 4/2019 | G06N 5/01 |

OTHER PUBLICATIONS

Falcao, Rodrigo, "Improving the Elicitation of Delightful Context-Aware Features: a Data-Based Approach", Department of User Experience and Requirements Engineering Fraunhofer Institute for Experimental Software Engineering IESE Kaiserslautern (Germany). pp. 562-567. (Year: 2017).*

"ClickHelp—Software for Online User Manuals Creation", Retrieved from: https://clickhelp.com/use-cases/software-user-guides-and-manuals/, Retrieved Date: Oct. 5, 2023, 11 Pages.

"Document360", Retrieved from: https://document360.com/user-manual-software/?kc_camp=s-usermanualsoftware-india&kc_adgrp=softwaremanual&kc_keyword=software%20manual&kc_device=,c&kc_loc_physical_ms=9183992&gclid=Cj0KCQjwmvSoBhDOARIsAK6aV7hUczwGJw9A5-SuUuXjrkL5ZhCkbPeHkp5sCCWN-le9X52qzkXu9_caAld-EALw_wcB, Retrieved Date: Oct. 5, 2023, 4 Pages.

Final Office Action mailed on Aug. 28, 2023, in U.S. Appl. No. 17/833,340, 28 pages.

Final Office Action mailed on Oct. 24, 2024, in U.S. Appl. No. 17/833,340, 27 pages.

Non-Final Office Action mailed on Feb. 6, 2023, in U.S. Appl. No. 17/833,340, 29 pages.

Sukaviriya, et al., "Coupling A UI Framework with Automatic Generation of Context-Sensitive Animated Help", In Proceedings of the 3rd annual ACM SIGGRAPH symposium on User interface software and technology, Aug. 1, 1990, pp. 152-166.

Non-Final Office Action mailed on Feb. 5, 2024, in U.S. Appl. No. 17/833,340, 23 pages.

* cited by examiner

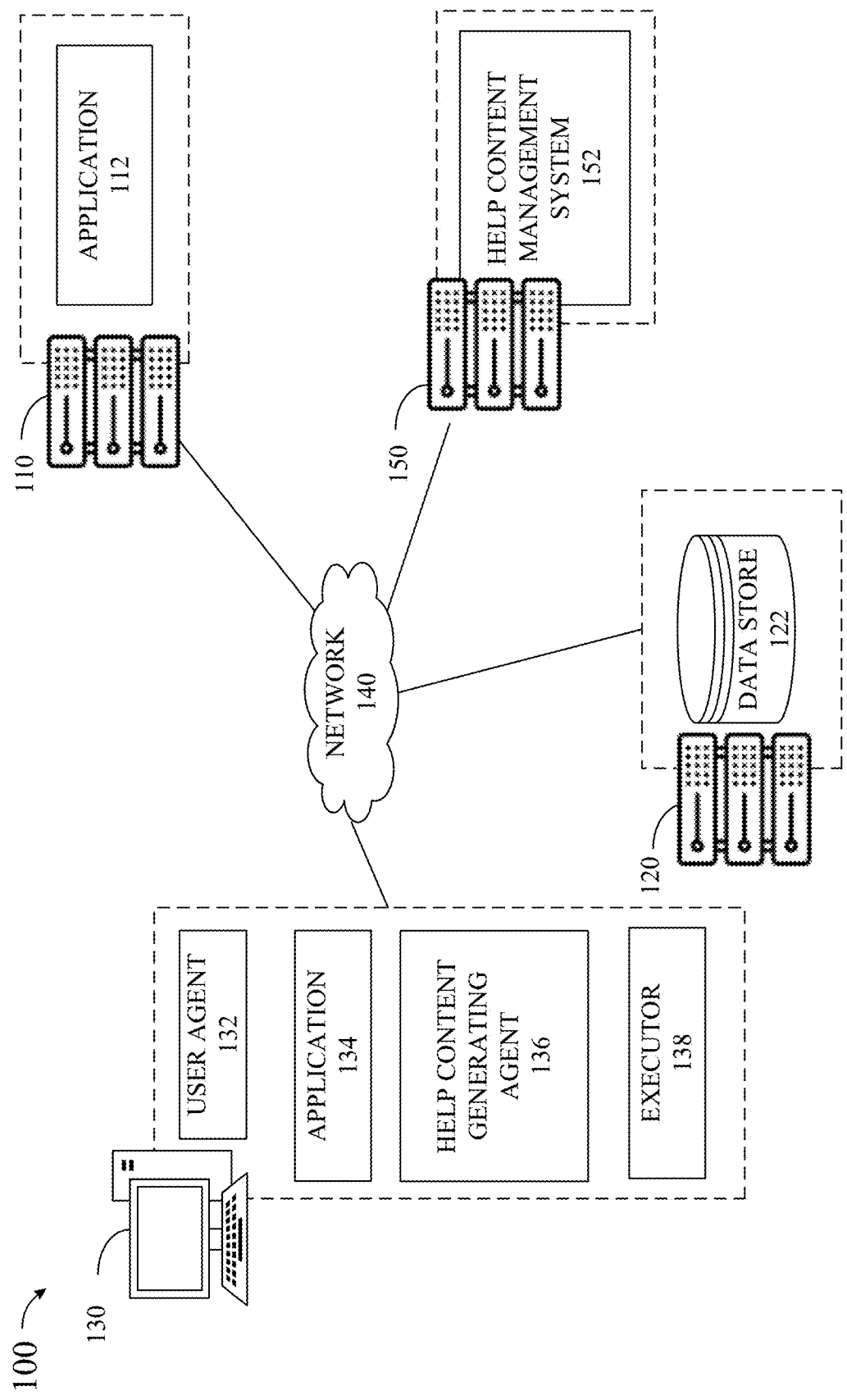

METHOD AND SYSTEM OF AUTOMATICALLY GENERATING HELP DOCUMENTATION

BACKGROUND

Many of today's software applications include numerous features and options for performing various actions. In order to help users learn about these features and discover how to perform various functions, many software applications offer documentation and help articles on different topics and application features. Creating such help articles, however, is time-consuming and challenging. Moreover, many software applications undergo agile development and experimentation, thus requiring quick development and/or changes to help documentation.

Furthermore, features are continuously being added, removed or updated in software applications. When a change to a feature is made, a previously created help article associated with the feature may no longer be applicable. With the number of features offered by many software applications and the frequency with which features are changed, keeping track of feature changes and maintaining comprehensive and up-to-date help documentations becomes a very complex and challenging task. This task often requires substantial human intervention from a group of developers who are well-versed in the workings of the software application and have expertise in creating help documentation. This is a timely and cost extensive process, and because of the complexities and number of people involved may result in inconsistent, incomplete, outdated or inaccurate help documentation.

Hence, there is a need for improved systems and methods of intelligently generating help documentation.

SUMMARY

In one general aspect, the instant disclosure presents a data processing system having a processor and a memory in communication with the processor wherein the memory stores executable instructions that, when executed by the processor alone or in combination with other elements, cause the data processing system to perform multiple functions. The function may include examining application data and a user query for an application, the application data including information about a plurality of user interface (UI) elements available in a UI screen of the application and information about one or more relationships between one or more of the plurality of UI elements, and the user query identifying a functionality of the application for which a help article on how to perform the functionality in the application should be generated; generating a prompt, using a prompt generating engine, for submission to an artificial intelligence (AI) model, the prompt being generated based on the application data and the user query; receiving an automatically generated help article on how to perform the functionality in the application from the AI model; providing the automatically generated help article for at least one of display to a user or validation via simulation, wherein validation via simulation is performed by automatically executing a step of the automatically generated help article in the application via an executor, the executor being a software application that runs on the application; determining a current state of the application after the step is executed; determining that a next step of the automatically generated help article can be executed in the current state of the application; upon determining that the next step of the automatically generated help article can be executed in the current state of the application, executing the next step of the automatically generated help article via the executor; and continuing with determining the current state of the application after the next step is executed, determining that the next step of the automatically generated help article can be executed in the current state of the application and executing the next step of the automatically generated help article via the executor until each step of the automatically generated help article is executed or an error occurs.

In yet another general aspect, the instant disclosure presents a method for automatically generating help documentation for an application. In some implementations, the method includes examining application data and a user query, the application data including information about a plurality of user UI elements available in a UI screen of the application and information about one or more relationships between one or more of the plurality of UI elements, the user query identifying the functionality; generating a prompt, using a prompt generating engine, for submission to an AI model, the prompt being generated based on the application data and the user query; receiving an automatically generated help article on how to perform the functionality in the application from the AI model; simulating the automatically generated help article in the application by executing each step of the automatically generated help article in the application via an executor, the executor being a software application that runs on the application; determining a current state of the application after each step is executed; determining that a next step of the automatically generated help article can be executed in the current state of the application; upon determining that the next step of the automatically generated help article can be executed in the current state of the application, executing the next step of the automatically generated help article via the executor; and continuing with determining the current state of the application after the next step is executed, determining that the next step of the automatically generated help article can be executed in the current state of the application and executing the next step of the automatically generated help article via the executor until each step of the automatically generated help article is executed or an error occurs.

In a further general aspect, the instant application describes a non-transitory computer readable medium on which are stored instructions that when executed cause a programmable device to perform functions of receiving a help article for validation, the help article including step by step instructions for performing a functionality in an application; simulating performance of the help article in the application using an executor software application running on the application by: executing a step of the help article in the application via the executor; determining that the step was performed successfully; displaying information about the step on a user interface screen; determining a current state of the application after the step is executed; determining that a next step of the help article can be executed in the current state of the application; upon determining that the next step of help article can be executed in the current state of the application, executing the next step of the help article via the executor and displaying information about the next step on the user interface screen; and continuing with determining the current state of the application after the next step is executed, determining that the next step of the help article can be executed in the current state of the application and executing the next step of the help article via the executor until each step of the help article is executed or an error occurs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 1 depicts an example system upon which aspects of this disclosure may be implemented.

DETAILED DESCRIPTION

Figure 2A:
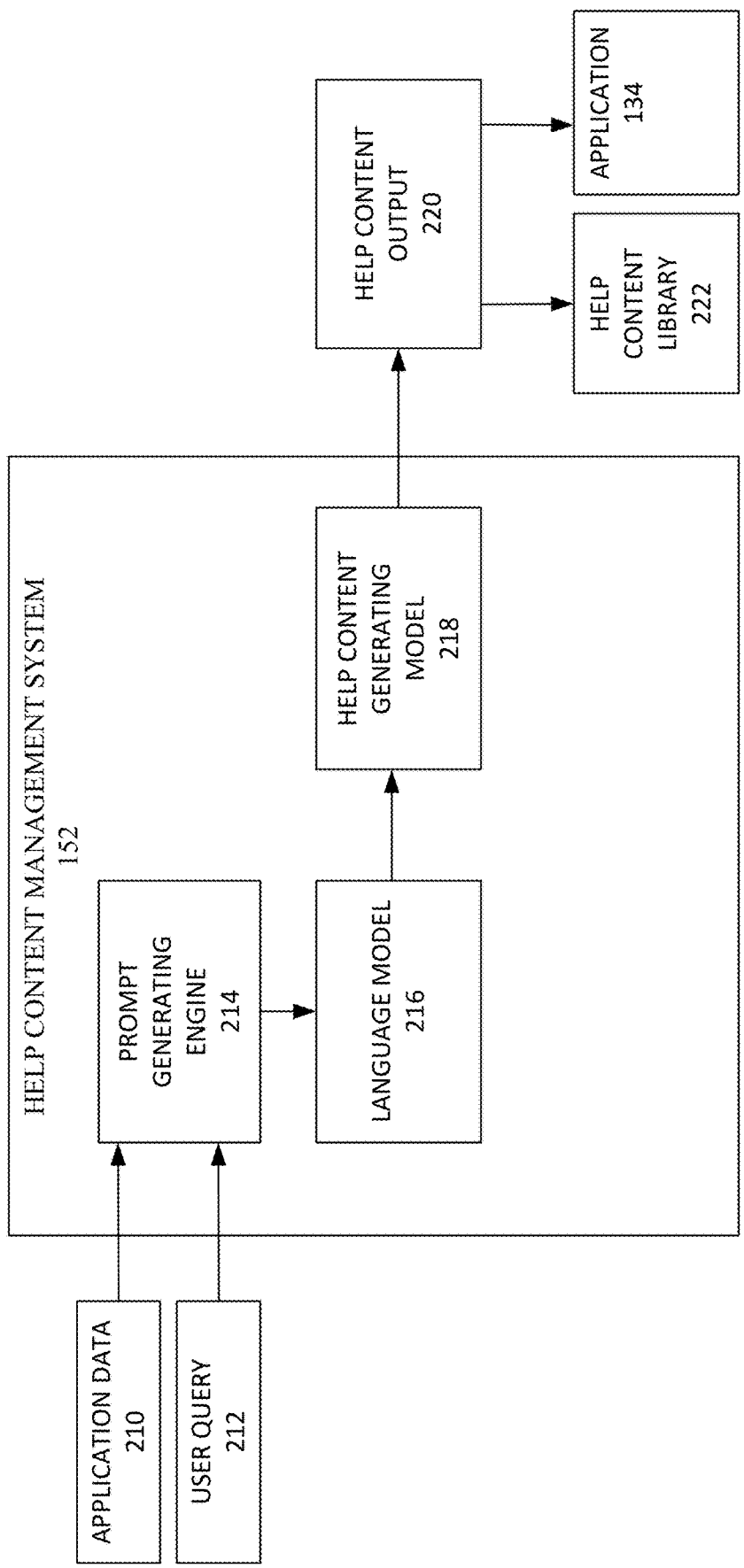
FIG. 2A depicts an example data flow between some elements of an example system upon which aspects of this disclosure may be implemented.

It is common for complex software applications to offer help documentation to assist users in determining how to perform certain actions. Creating help documentation often requires having a clear understanding of the functionalities of the software application, as well as having expertise in writing concise instructional articles. For complex software applications having many different features, this often requires extensive human intervention by several different people. Because different people have different writing styles, this can lead to inconsistencies in the formatting and language of the help documentations. Furthermore, creating help documentation for numerous software application features requires extensive time and resources. This is made more complex by frequent changes and updates to software programs that may involve adding, removing and/or updating various features. Keeping track of all the changes and constantly revising the documentation in response to the changes is not only expensive and time-consuming, but also impractical for many complex applications. Furthermore, these frequent changes in software applications result in an increased need for up-to-date help documentation, as the users are more likely to find themselves unable to perform various functions in an application, they are familiar with and existing help documentations are often outdated, leading to potential misinformation and user frustration. Still further, many software development companies have specific writing guidelines that need to be adhered to when creating help documentation. However, ensuring consistency across a vast number of help articles can be a daunting task. Thus, there exists a technical problem of current mechanisms for creating software application help documentations being inefficient, costly, difficult to maintain and leading to inconsistencies between various help documentations. This results in the inability of users to properly make use of software applications, which can result in unnecessary use of computing resources as the users utilize memory and processing resources in unsuccessful attempts at performing an action.

To address these technical problems and more, in an example, this description provides technical solutions for using an artificial intelligent (AI) model to generate help content for a given functionality in a software application, validating the help content by running through every step in the help content in a live environment to detect discrepancies, and updating the help content with corrections of those discrepancies to form a feedback loop. This involves integrating a help content agent into the software application, and linking the help content agent with a language model that provides help content in response to user requests, as needed. This enables continuous updating of help content. In some implementations, the help content agent provides information about navigable elements available for user interaction in the application to determine the most likely path for use in an initial help content. The navigable elements are provided in a prompt to the language model, which uses the prompt to generate one or more actions for performing a function in the application. In some implementations, the language model is also used to validate the generated help content by executing the suggested actions in a live environment. In this manner, the technical solution reduces the amount of computing resources required to generate help content and the amount of computing resources required to perform certain action in a software application which may occur due to erroneous user selections. The technical solution provides an automatic help documentation generation and maintenance system that can quickly and efficiently generate help content, as needed. This minimizes the amount of manual intervention required, thus increasing the accuracy and consistency of help documentations and increasing customer satisfaction.

As will be understood by persons of skill in the art upon reading this disclosure, benefits and advantages provided by such implementations can include, but are not limited to, a technical solution to the technical problems of lack of mechanisms for efficient and accurate generation of help documentation for software applications. The technical solutions enable automatic generation of help content based on user need and based on the latest version of the software application. This not only eliminates or reduces the need for human intervention, but also results in higher quality and more accurate help content, as the latest version of the software application is used for generating the help content. Furthermore, use of a language model for automatic generation of help documentation ensures consistency across many help documentations, thus enabling adherence to any required writing or formatting guidelines. Moreover, by enabling automatic validation of an automatically generated help article, the technical solution enables automatic verification of the generated content, thus improving accuracy in an efficient manner. In this manner, the technical solution minimizes manual input and improves the operation and efficiency of computer systems by providing accurate help documentation for performing actions in software applications in an efficient manner. The technical effects at least include (1) improving the efficiency and accuracy of generating help documentation for software applications; and (2) improving the efficiency of maintaining and updating help documentation by enabling generation of help documentation in real-time; (3) minimizing the frequency and size of software application updates due to help content updates; and (4) reducing the amount of bandwidth and computing resources required to generate and transmit software application updates due to help content updates.

As used herein, the terms "application," and "software application" may refer to any software program that provides options for performing various tasks or functionalities. The term "action," "functionality" or "task" may refer to any command or action offered by an application for performing a task or functionality. Furthermore, the term "help documentation", "help article" or "help content" refers to a set of instructions or steps for performing an intended action in an application.

FIG. 1 illustrates an example system 100, upon which aspects of this disclosure may be implemented. The system 100 includes a server 110, which includes an application 112, and a server 150 which includes a help content management system 152. While shown as one server, the servers 110 and 150 may represent a plurality of servers that work together to deliver the functions and services provided by each system or application included in the servers. The servers 110 and 150 may operate as shared resource servers located at an enterprise accessible by various computer client devices such as a client device 130. The servers 110 and 150 may also operate as a cloud-based server for help content management services and/or online applications.

The server 150 includes and/or executes a help content management system 152, which receives a request for generating a help article for an application such as the application 112 or application 134 and uses information received about the application and/or the requested functionalities to identify action paths for arriving at the requested functionality. The help content management system 152 uses the received information to generate a prompt for a language model that identifies the action path for performing the functionality and automatically generates a help article that includes a set of instructions for performing the functionality based on the action path. In this manner, the help content management system 152 utilizes information about the version of the application for which help content is being generated to generate the help content, and generates the help content, as needed. The help content management system 152 then provides the generated help content to the application from which the request was originated to display the help content, as needed.

The system 100 also includes a server 120 which may be connected to or include the data store 122 which functions as a repository in which databases relating to training models and/or help documentations may be stored. Although shown as a single data store, the data store 122 may be representative of multiple storage devices and data stores which may be accessible by one or more of the help content management system 152 and applications 112/134.

The client device 130 is connected to the server 110 via a network 140. The network 140 may be a wired or wireless network(s) or a combination of wired and wireless networks that connect one or more elements of the system 100. The client device 130 may be a type of personal, business or handheld computing device having or being connected to input/output elements that enable a user to interact with various applications (e.g., application 112 or application 134). The client device 130 may be utilized by a help documentation curator to submit requests for generating a help article and review, validate, revise and/or approve help documentation. The client device 130 may also be utilized by an end user of the application 112 or 134 to submit a request for receiving help on how to perform a certain functionality in the application. In response, the user may be presented with an automatically generated help article which is generated in real-time. Examples of suitable client devices 130 include but are not limited to personal computers, desktop computers, laptop computers, mobile telephones, smart phones, tablets, phablets, smart watches, wearable computers, gaming devices/computers, televisions; and the like. The internal hardware structure of a client device is discussed in greater detail with respect to FIGS. 6 and 7.

The client device 130 includes a local application 134. The application 134 is a software program executed on the client device that configures the device to be responsive to user input to allow a user to perform various functions within the application 134. Examples of suitable applications include, but are not limited to, a help documentation generating application, a word processing application, a note application, a presentation application, a communications application, and the like. Application 134 may be representative of an application used to submit a request for help content.

In some examples, the application a user interacts with is executed on the server 110 (e.g., application 112) and provided via an online service. In some implementations, web applications communicate via the network 140 with a user agent 132, such as a browser, executing on the client device 130. The user agent 132 provides a user interface (UI) that allows the user to interact with the application 112.

In some implementations, the client device 130 includes a help content generating agent 136 and an executor 138. The help content generating agent 136 may be incorporated with the application 134 (e.g., via an application programming interface (API) to enable the user to utilize a help agent that provides real-time responses to the user's help requests. In an example, the help content generating agent 136 can be invoked from within the application 134, by utilizing a menu option (e.g., clicking on a button). Once invoked, the help content generating agent 136 enables display of a UI element that includes a user input box for receiving text and/or other mechanisms for receiving user input (e.g., a button to receive audio input). The user is then able to utilize the input mechanism to transmit a request for generating help content. The request may be in natural language. For example, the user may enter "show me how to insert a picture in the document". The help content generating agent 136 then transmits the user input as well as information about the application to the help content management system 152 for processing. In some implementations, the help content generating agent 136 functions independently of the application 134 (e.g., it is an independent software program). In such implementations, the UI includes an option for inputting the name of the application for which a help article needs to be generated.

To provide information about the application to the help content management system 152, the help content generating agent 136 extracts data from the application 134 on how the application enables performance of certain functionalities. In an example, this is done by examining the application code to extract data about toolbar command identifiers (TCIDs) or any other identifiers used by the application to identify specific commands and/or tasks in the application.

In another example, this is achieved by retrieving an accessibility tree provided as part of the application's (or a website's) Document Object Model (DOM). The accessibility tree is a subset of the DOM tree and contains elements from the DOM tree that are relevant and useful for displaying the contents of an application in a UI screen. As such, the accessibility tree often includes a list of UI elements of the application as well as information about how the various UI elements are related to each other. Thus, the accessibility tree provides an easy-to-use mechanism for identifying UI elements that can be used to perform a functionality in the application and also includes information about how to access a certain UI element (e.g., the number of steps that need to be taken to see a specific UI element). The help content generating agent 136 can retrieve the accessibility tree from the application code and transmit it along with the user request (e.g., keywords submitted by the user) to the help content management system 152 for processing. In alternative implementations, in addition to or instead of providing the accessibility tree, the help content generating agent 136 transmits visual data (e.g., images such as screenshots) about UI elements such as menu options, buttons, toolbars, etc. provided by the application.

In some implementations, the executor 138 is used to validate a help article. Once the request for generating help content is transmitted to the help content management system 152, an automatically generated help article may be transmitted back to the help content generating agent 136 and/or the executor 138 for validation. The executor 138 is a software program that runs on top of the application 134 to enable automatic performance of actions in the application. For example, the executor 138 may be able to parse the generated help content into step-by-step instructions, execute each instruction and by itself or in coordination with the help content generating agent 136 extract information about the state of the application after each step is executed. Further details about the operation of the executor 138 is provided with respect to FIGS. 2B and 3B.

FIG. 2A depicts an example data flow between some elements of an example system upon which aspects of this disclosure may be implemented. Upon receiving a user request, the application via which the request is received and/or the help content generating agent 136 which cooperates with the application transmits application data 210, as well as data containing the user query 212 to the help content management system 152 for processing. The application data 210 includes information about the application such as the accessibility tree that provides a list of UI elements and their relationship with each other and/or images about UI elements in the application. The user query 212 includes one or more keywords input by a user that provides information about the type of functionality or application feature for which help content is needed.

The help content management system 114 includes a prompt generating engine 214, a language model 216 and/or a help content generating model 218. The prompt generating engine 214 receives the application data 210 and the user query 212 and automatically generates a prompt for the language model 216. The prompt generating engine 214 generates the prompt such that it is likely to result in an accurate output from the language model 216 To achieve this, the prompt generating engine 214 takes into account the type of language model used, specific requirements of the language model such as maximum allowable characters for the prompt, the type of input that is likely to cause the model to hallucinate and the like. The prompt generating engine 214 processes the application data 210 and the user query 212 to generate a prompt that contains information about the application as well as the requested action for which help needs to be generated, while the prompt complies with the requirements and needs of the language model 216. For example, the prompt generating engine 214 may remove extraneous words or phrases from the user query 212. In another example, the prompt generating engine 214 converts the application data 210 to a format that is easily usable by the language model 216. For example, if the application data 210 includes a list of TCIDs and/or other identifiers, the prompt generating engine 214 may determine relationships between the TCIDs and UI elements of the application and/or relationships between various UI elements and include that information in the prompt. This may be achieved by using metadata, application code and/or other application data from the application. Thus, the resulting prompt has information about the navigational elements available in the application and their relationships with each other (e.g., which UI elements are shown on the same page, which UI elements are shown when a button is selected, etc.). Depending on the type of language model used, the prompt may include a request for the output (e.g., generate a help article for inserting a picture in this application) and/or may include specific requirements for the output (e.g., include pictures in the instructions, etc.). It should be noted that while the prompt generating engine 214 is displayed as part of the help content management system 152, the prompt generating engine 214 may be separate from the help content management system 152. In some implementations, the prompt generating engine 214 is part of the help content generating agent 136 of FIG. 1, and thus the prompt is transmitted from the client device 130 to the help content management system 152.

The language model 216 receives the prompt from the prompt generating engine 214 and uses the information contained in the prompt to identify an action path in the application for arriving at the intended action. In some implementations, the language model 216 is a large language model (LLM). An LLM is a language model characterized by its large size and is a type of AI system designed to understand and generate human language. LLMs are often pre-trained using self-supervised and/or semi-supervised learning. An LLM is built upon deep learning techniques and massive amounts of text data to process and generate natural language text. GPT (Generative Pre-trained Transformer) is an example of an LLM. GPT is trained on an extensive corpus of text from the internet and other sources, enabling it to perform a wide range of natural language processing tasks. GPT can understand and generate human-like text, making it highly versatile. A GPT architecture, the Transformer, is particularly adept at capturing contextual information, allowing it to produce coherent and contextually relevant responses in a wide variety of applications, from chatbots and language translation to content generation and more. Thus, in an example, the language model 216 is a GPT model.

By including information about the navigable elements available to a user in the application and information about the intent (e.g., desired functionality or outcome in the application), the language model 216 is able to decide which of the elements will most likely accomplish the task. In an example, the language model 216 achieves this by implementing a depth-first search approach. This may involve attempting a first navigable element (e.g., UI menu) available in the application (e.g., a navigable element that is at the top level of the tree) to see if selection of the first navigable element results in the display of a second UI element that enables performance of the functionality or leads to display of a third UI element, upon selectin of which the functionality is performed, and so on, until an action path is identified that results in arriving at the desired functionality. When an attempted path does not arrive at the desired functionality, the language model 216 discards the path and attempts a different path until an action path is identified.

When the action path has been identified, information about the action path which includes information about the navigable elements included in the path are transmitted from the language model 216 to the help content generating model 218 to automatically generate a help article based on the action path. The help content generating model 218 may be a trained ML model that is trained to generate instructions for performing a functionality in an application based on an identified action path. In some implementations, the help content generating model 218 is a language model such as a GPT model (e.g., GPT4). In other implementations, the language model 216 itself generates the help article.

In some implementations, to use the help content generating model 218 to generate a help article containing instructions for performing a functionality, another prompt generating engine (not shown) is utilized. In an example, the information about the action path is modified using a template to convert the data into textual string prompts. The textual string prompts are then used by the model to generate a set of instructions for performing the functionality associated with the action path. In this manner, the help content generating model 218 can quickly and efficiently generate help documentation associated with functionalities offered by the application. In an example, the help content generating model 218 employs few-shot learning to generate the help article.

In some implementations, in generating the help article, the help content generating model 218 (or language model 216) takes into account an organization's guidelines, formatting requirements and writing styles. This may be achieved by providing information about the guidelines and requirements to the language model 216 and/or the help content generating model 218. This information may be provided by the help content generating agent 136 and maybe included in the application data 210. The information is then incorporated into the prompt generated for the language model 216 and/or the prompt generated for the help content generating model 218. In this manner, the help content management system 152 is able to efficiently and quickly generate help articles that are not only accurate based on the latest available application data but also comply with organizational guidelines or requirements for help content. This significantly increases efficiency and reduces the amount of human intervention required, thus resulting in reduced costs. Furthermore, this process results in generating help articles that are consistent in format and/or style.

The resulting help article generated by the help content generating model 218 is provided as the help content output 220. The help content output 220 may consist of a help article or any other kind of documentation that provides step by step instructions/information on how to perform a given functionality in a given application. The instructions may include images (e.g., UI element) of menu options that need to be selected or otherwise interacted with to perform the desired action. The help content output 220 may also include information about the action path used to generate the help documentation. The information about the action path may be stored as metadata and/or properties of the help content.

In some implementations, the help content output 220 is directly transmitted to a help content library 222 for storage and use with the application. In other implementations, the automatically generated help content output 220 is transmitted to the application 134 (or application 112) from which the request to generate the help content was received. This enables the user that submitted the request to review and approve and/or modify the article before it is added to the help content library 222. This may entail a review of the help article by an expert to ensure the content is accurate, efficient and/or correctly conveys the necessary steps for performing the functionality.

When the new help article is stored in the help content library 222, information associated with the help articled may be added to a database containing a list of help documentations for the application. This may provide an index for a quick lookup of help documentations when needed and may include keywords for the functionality for which the help documentation was generated and information about the location at which the help article is stored. The help content library 222 is a dataset for storing help documentations for one or more applications. In some implementations, the help content library 222 is stored in a data store such as the data store 122. In an example, the help content library 222 is stored in the same storage medium as the application (e.g., with the source code). In a system having multiple applications, each application may have its own library of help documentations.

Figure 2B:
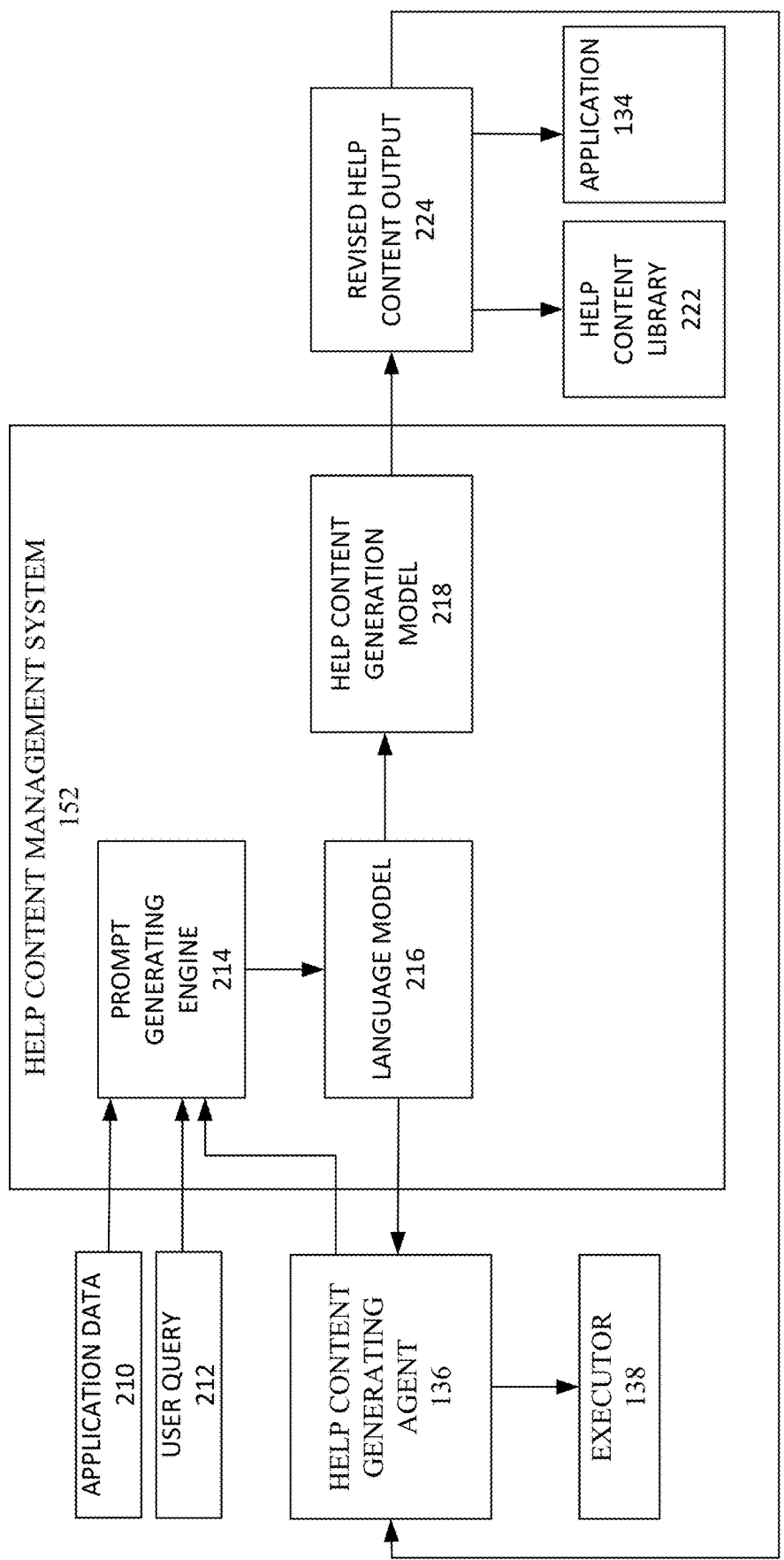
FIG. 2B depicts an example data flow between some elements of an example system that includes validation of automatically generated help articles.

Reviewing automatically generated help articles to verify their accuracy and/or efficiency is a time and resource consuming task. This is particularly true for applications having hundreds of help articles which are continuously updated, as the application is revised and updated. To address these technical problems, the technical solutions provided herein offer an automated verification process that automatically verifies accuracy of help content. FIG. 2B depicts an example data flow between some elements of an example system that provides validation of automatically generated help articles. In some implementations, in addition to or instead of transmitting the generated help content output 220 to the help content library 222 or application 134, the generated help content output 220 is transmitted to the help content generating agent 136. The help content generating agent 136 may provide a UI element that enables the user to view the generated help article and a UI element (e.g., a menu button) that enables the user to validate the generated help article. In some implementations, the generated help content output 220 is automatically transmitted to the help content generating agent 136 and/or the help content generating agent 136 automatically begins the process of validating the automatically generated help article, when a newly generated help article is received. In implementations where the help content generating agent 136 provides a UI element for submitting a request to validate a help article, the help content generating agent 136 may also enable the user to submit any help article (e.g., automatically or manually generated as well as either a new help article or an old one) for validation.

Upon receiving the request to validate or upon receiving a new help article that requires validation, the help content generating agent 136 makes use of the executor 138 to execute the steps in the help article. This may involve parsing the help article to identify the first step in the instructions and submitting the first step to the executor. As mentioned before, the executor 138 is an algorithm that is able to automatically execute an action in the application. Upon receiving the first step, the executor 138 parses the first step, if the step includes multiple steps for arriving an action and executes the first step (e.g., selects a menu option). When the executor 138 is able to perform the step, there may be a change in the state of the application (e.g., a different toolbar is displayed, a pop-up menu is displayed, a contextual menu is displayed, etc.). This indicates that the step was successful. The help content generating agent 136 then transmits the next step to the executor 138 for execution. This process is repeated until the steps in the help article are fully performed or until the executor 138 is unable to perform a step. This may occur, for example, when the instructions require the executor 138 to select a menu option that is not available on the current display screen of the application. When this occurs, the executor 138 transmits a message to the help content generating agent 136 that execution was unsuccessful, which may display a notification to the user that informs the user of the error.

In some implementations, the notification provides information about the unsuccessful step (e.g., unable to click Enable Dark Mode). This enables the user to identify the incorrect step and may be helpful in quickly and efficiently correcting the help article. When the validation process is successful, the help content generating agent 136 may display a notification to inform that the user of the successful validation of the help article. In some implementations, successful validation of an automatically generated help article results in automatic storage of the help article in the help content library 222. This enable a fully automated help article generation process.

In some implementations, when validating a help article is unsuccessful, information about the incorrect help article is transmitted back to the help content management system 152. This information may be provided along with the original user query 212 and the application data 210. The prompt generating engine 214 utilizes the received information to generate a prompt that informs the language model 216 of the failure of the previously generated help article (e.g., the failed step) and provides the information required to generate a new help article. In this manner, a feedback loop is generated that makes use of a live environment to detect errors and enables the language model 216 to correct the detected errors by generating an updated help article. The prompt may include information that specifically identifies the issue faced during the validation process. For example, when the instructions include the phrase "click advanced, and display", the executor 138 may be unable to perform the action, when there is both a display label and a display button in the UI tree. This information is transmitted from the help content generating agent 136 to the prompt generating engine 214 which generates a prompt requesting that the language model clarify the instruction. In response, the language model generates a revised action path which is used by the help content generating model 218 and/or the language model 216 to generate a revised help content output 224. In some implementations, the language model 216 and/or the help content generating model 218 simply changes the wording of the help content to clarify the problematic step. The revised help content output 224 is then transmitted to the help content library 222, application 134 and/or help content generating agent 136 for storage, display and/or validation as needed.

Figure 3A:
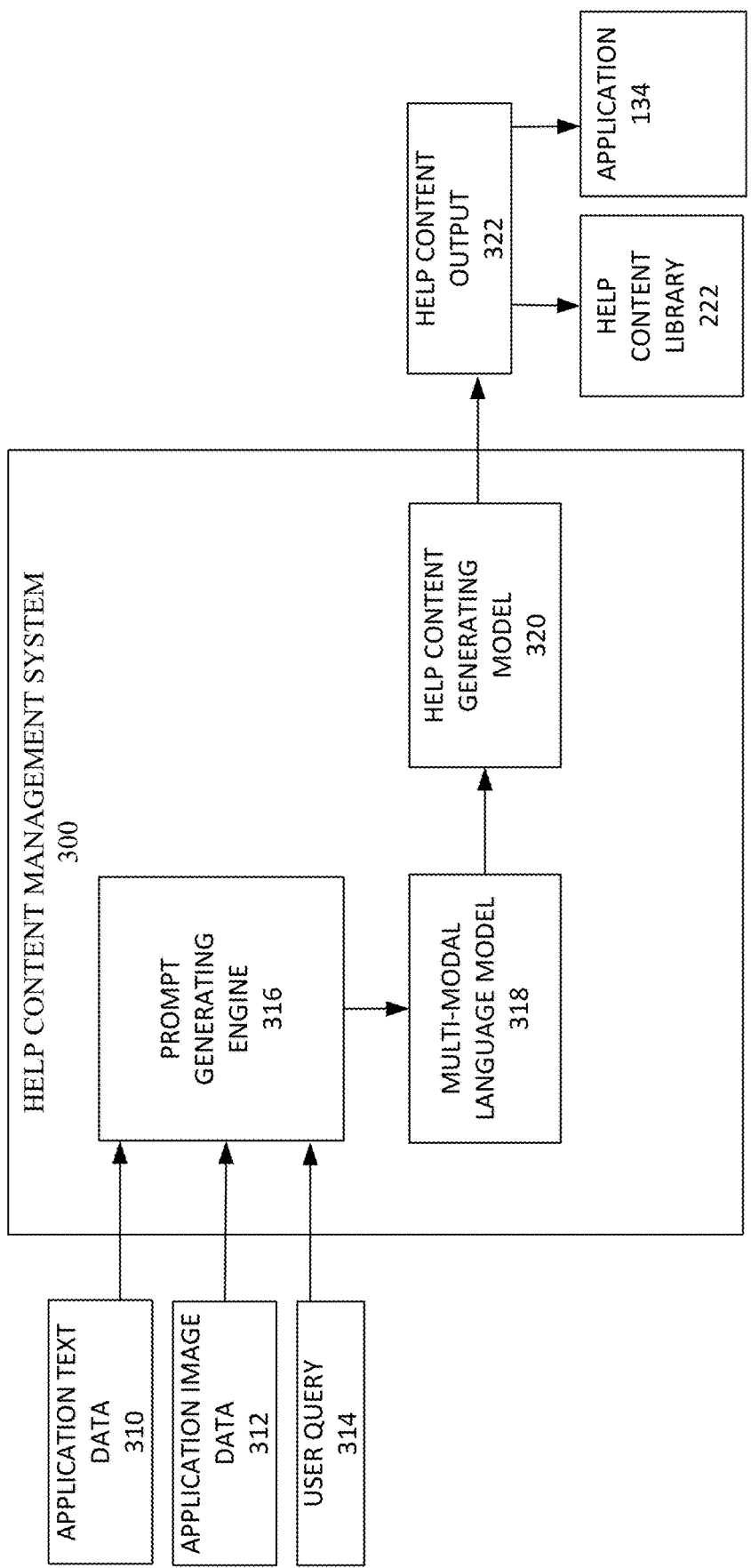
FIG. 3A depicts an example data flow between some elements of an alternative example system upon which aspects of this disclosure may be implemented.

FIG. 3A depicts an example data flow between some elements of an alternative example system upon which aspects of this disclosure may be implemented. The help content management system 300 is similar to the help content management system 152 of FIGS. 2A-2B and functions in a similar manner. However, instead of utilizing a language model, the help content management system 300 makes use of a multi-modal language model (MMLM). An MMLM is model that understands and processes text as well as other types of data. In an example, an MMLM can process both text and image data. This allows the help content management system 300 to not only comprehend textual prompts but also analyze and interpret images/screenshots from the software application, thus making the content creation and validation processes even more accurate and efficient.

The prompt generating engine 316 can receive both application text data 310 and application image data 312. In an example, the user submitting the user query 314 provides one or more images (e.g., screenshots) from the application along with the user query 314. In another example, the help content generating agent 136, along with transmitting the application data 310 (e.g., UI tree) submits one or more images displaying visual elements of the application. The help content generating agent 136 may achieve this by extracting this information from application code (e.g., application resource files) or by taking a screenshot of the application. The prompt generating engine 316 includes the image data into the prompt generated for the multi-modal language model 318.

Using the prompt, the multi-modal language model 318 analyzes the images to identify UI elements, detect their positions, and identify potential interactions. The UI elements may include menu buttons, text fields, dropdown menus, icons, and other navigable elements. The multi-modal language model 318 correlates the visual elements from the image(s) with the textual descriptions provided in the prompt. This ensures that the model has a comprehensive understanding of the software application's functionality and user flow. As a result, the multi-modal language model 318 is able to generate an action path that is more likely to be accurate. In some implementations, the resulting action path is transmitted to the help content generating model 320 which operates in a similar manner as the help content generating model 218 to generate the content output 322. In other implementations, the multi-modal language model 318 itself generates the help content output 322. By having information about the actual UI elements, the multi-modal language model 318 and/or the help content generating model 320 is able to generate more accurate, more concise and clearer instructions. Furthermore, alongside traditional text-based help articles, the multi-modal language model 318 can generate visual guides. These guides can include annotated screenshots, highlighting the steps a user needs to follow. Annotations can be visual elements that are added to screenshots to enable the user to follow the action path. Examples of visual elements include arrows, circles, or textual overlays that guide the user through the steps of the process. The generated help content output 322 is transmitted to the help content library 222 and/or application 134 for storage and/or display in a similar manner as that discussed above with respect to FIG. 2A.

In some implementations, the multi-modal language model 318 is used by a user that provides an image query without a textual description of the user query. The prompt generating engine 316 is able to generate a prompt based on the image and transmit the prompt to the multi-modal language model 318 to generate a description based on the visual content. This is useful for creating alt-text for accessibility or when the user wants to ensure their interpretation aligns with the model's interpretations.

Figure 3B:
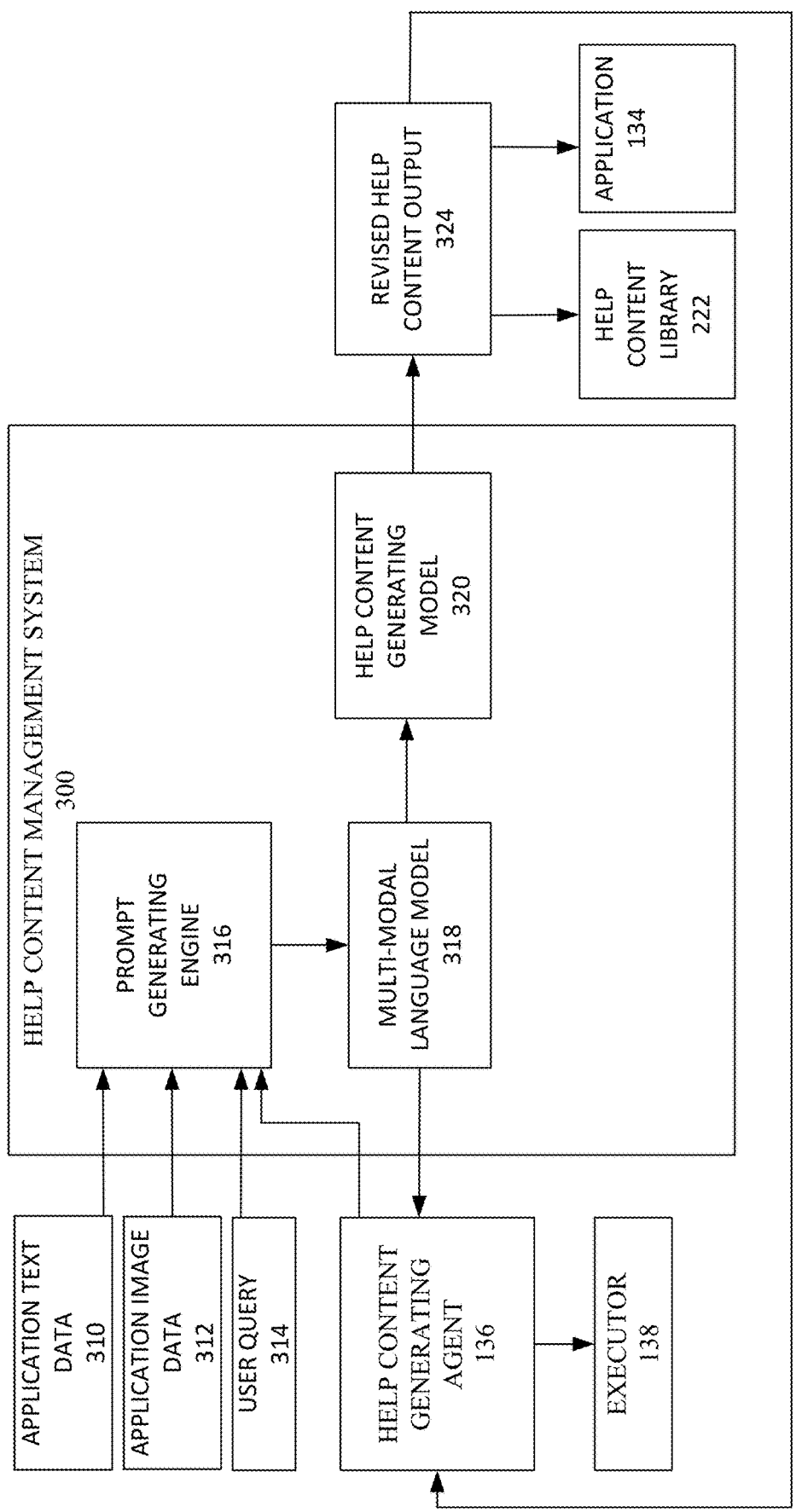
FIG. 3B depicts an example data flow between some elements of an alternative example system that includes validation of automatically generated help articles.

FIG. 3B depicts an example data flow between some elements of an example system that includes validation of automatically generated help articles that are generated using an MMLM. In some implementations, in addition to or instead of transmitting the generated help content output 322 to the help content library 222 or application 134, the generated help content output 322 is transmitted to the help content generating agent 136 for validation. The validation process is similar to the process discussed with respect to FIG. 2B. However, when the generated help content includes visual elements, in addition to executing the textual steps in the help content, the help content generating agent 136 also compares the visual elements to the visual elements of the application (e.g., the latest visual elements) to ensure there is no discrepancy between the visual elements provided in the instructions and the current UI elements of the application. Discrepancies may be identified when a UI element (e.g., a button) is in a different location or a UI element looks different from that shown in the generated help content. This information may be transmitted back to the help content management system 300 create a feedback loop. In response, the multi-modal language model 318 analyzes the discrepancies and updates the help article to generate a revised help content output 324. The revised help content output 324 may include updated visual elements and/or updated steps that are aligned with the latest version of the application.

Figure 4A:
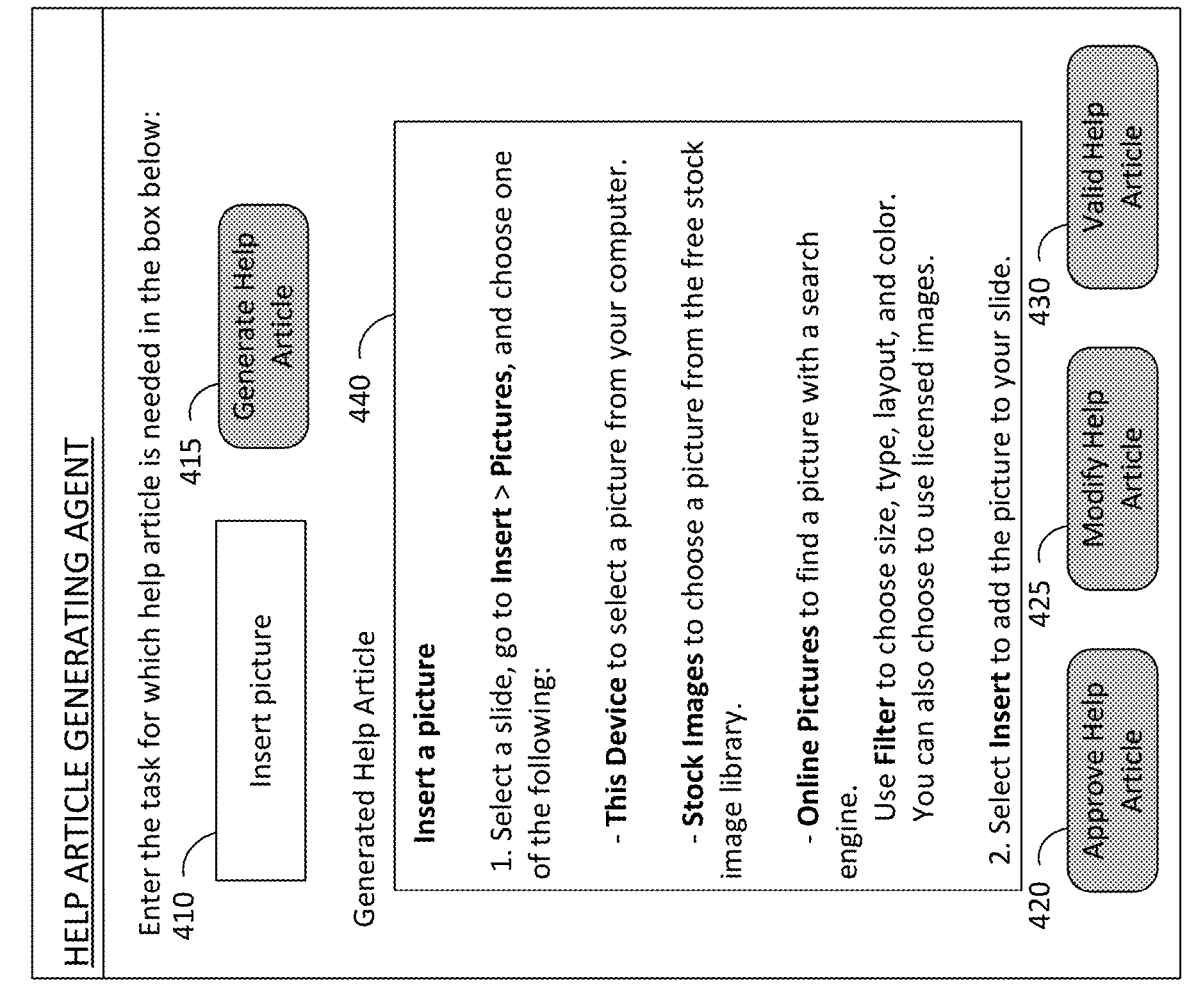
FIGS. 4A-4B depict example GUI screens of an application or service that automatic help content generation and/or validation.
Figure 4B:
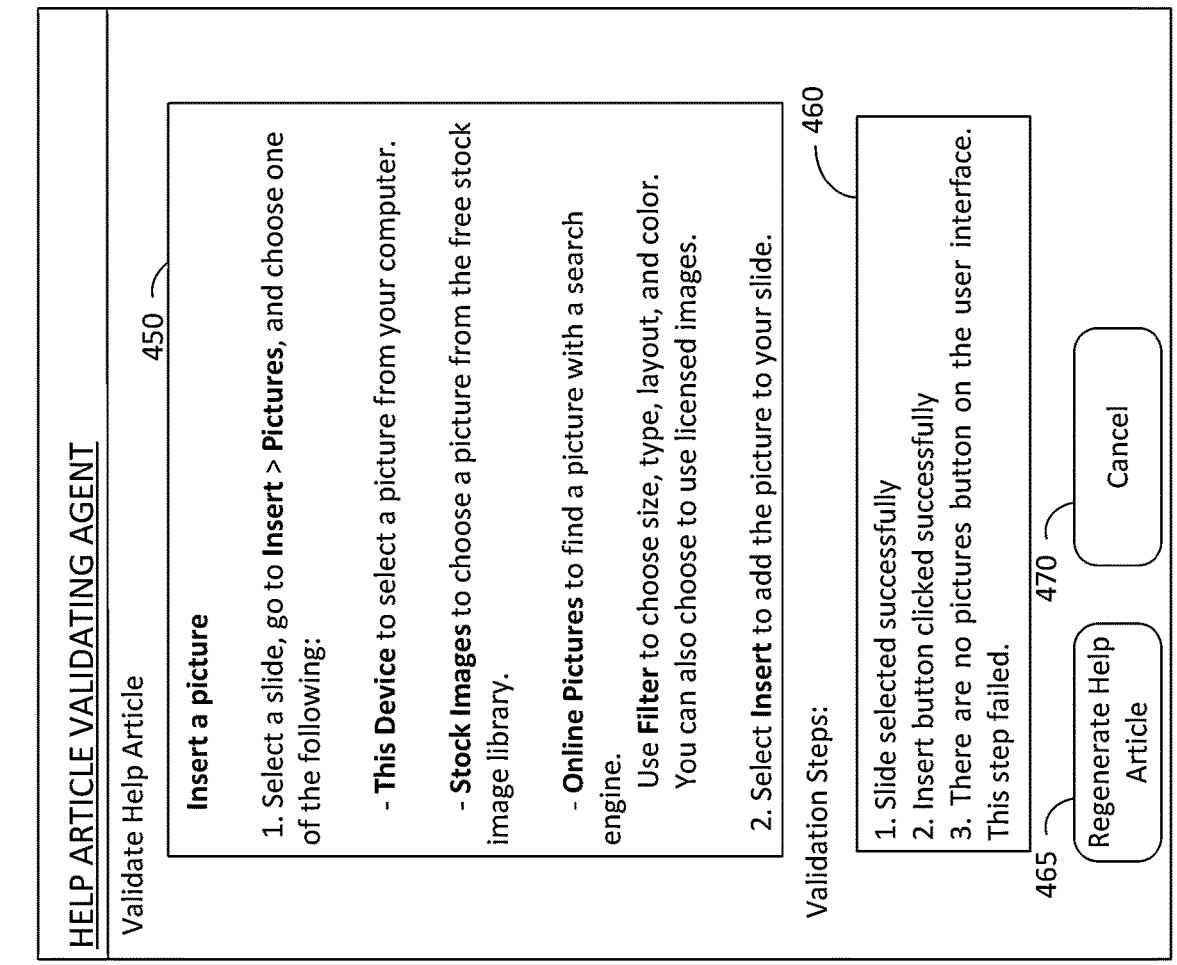

FIGS. 4A-4B depict example GUI screens of an application or service that provides automatic help content generation and/or validation. In some implementations, the GUI screen 400A of FIG. 4A is displayed by an application when a request to begin the process of generating help articles is received (e.g., a menu button is pressed). In another example, the GUI screen 400A is displayed when a help article generating application is invoked. The GUI screen 400A displays an input box 410 that enables the user to insert keywords or a request (e.g., in natural language) for generating a help article for a specific functionality. The inserted keywords may simply identify the functionality (e.g., insert picture) or they may include additional information (e.g., generate a help article for inserting a picture in Microsoft® Word). In another example, the GUI screen 400A would include a UI element for enabling the user to submit additional input (e.g., a UI menu that enables the user to select an image to submit with the request).

Once the user is done entering their input, they can select the UI element 415 to generate a help article related to the user input. In response, the user input as well as information about the application is submitted to a help content management system (e.g., help content management system 152) which makes use of a language model to automatically generate a help article for the requested functionality. The generated help article is then returned and displayed in the GUI screen 400A in the UI element 440. In some implementations, each step of the help article is displayed in the UI element 440 as they are generated.

After the help article is generated and displayed in the GUI screen 400A, the user is able to make use of additional UI elements, such as UI elements 420, 425 and 430 to approve the help article, submit a request to modify the help article or validate the help article, respectively. When the UI element 420 is selected to approve the help article, the automatically generated help article is stored in a help content library for future use. When the user selects the UI element 425 to modify the help article, a second UI screen may be displayed that enables the user to modify the content of the help article, before submitting the help article for storage. In some implementations, the user is simply able to modify the content displayed in the UI element 440 and select a UI element for saving the changes.

In some implementations, when the user selects the UI element 430 for validating the help article, a second screen such as the GUI screen 400B of FIG. 4B is displayed. The GUI screen 400B enables the user to enter the help article they desire to validate by inputting the help article in the UI element 450. When the user selects the UI element 440 in the GUI screen 400B, the help article may be automatically inserted into the UI element 440. In some implementations, once the help article is inserted into the UI element, validation begins automatically. In other implementations, GUI screen 400B includes another UI element (not shown) for beginning the validation process.

Once validation starts, information regarding the validation process is displayed in the UI element 460. The information may include step by step updates as the executor parses the steps in the help article and attempts to execute each step. When there is a step that cannot be performed, the information identifies the step and informs the user that the step failed. In this manner, the user is able to quickly identify the problem and revise the help article, if desired. Alternatively, the user may select the regenerate help article UI element 465 to submit feedback regarding the help article to the help content management system and request that the system generate an updated help article. The user may also select to cancel the validation process by selecting the UI element 470. Other UI options are presented to the user in alternative implementations.

Figure 5:
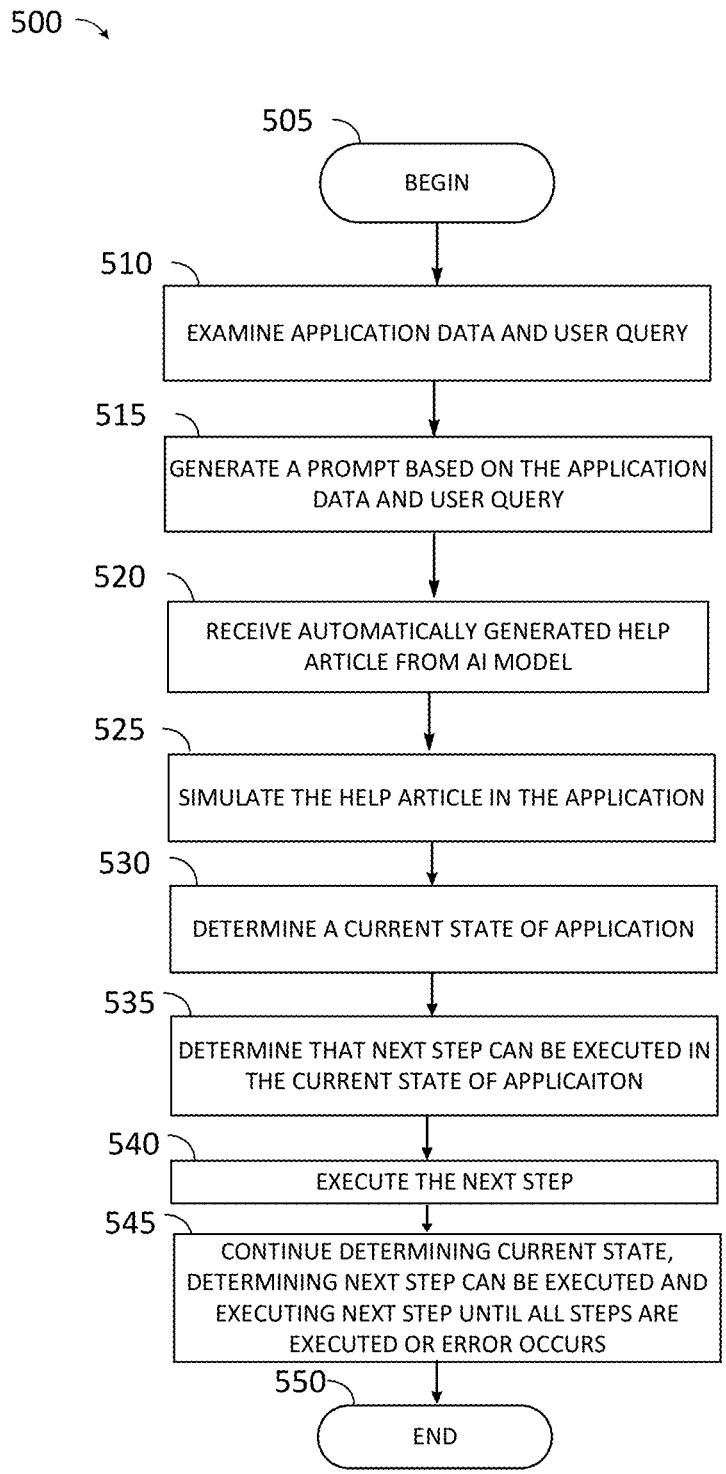
FIG. 5 is a flow diagram depicting an exemplary method for automatically generating help content for a software application.

FIG. 5 is a flow diagram depicting an exemplary method 500 for automatically generating a help content for a functionality of a software application. One or more steps of the method 500 may be performed by a help content management system such as the help content management system 114 of FIGS. 1, 2A-2B and 3A-3B. The method 50 begins, at 505, and proceeds to examine application data and a user query, at 510. This may involve receiving, retrieving or accessing application data and the user query. The application data includes information about a plurality of UI elements available in a UI screen of the application as well as information about one or more relationships between the plurality of UI elements. The user query includes information (e.g., keywords) identifying the functionality for which help content should be generated.

After examining the application data and user query, method 500 proceeds to generate a prompt, using a prompt generating engine, for submission to an artificial intelligence (AI) model, at 515. The prompt is generated based on the application data and the user query and is generated such that it provides the information required for the AI model to generate a help article for the functionality. The AI model may be a language model (e.g., LLM) or multi-modal language model. The generated prompt is then submitted to the AI model. In response, an automatically generated help article about the functionality is received from the AI model, at 520.

Once the automatically generated help article is received, it is simulated in the application, at 525. This may be done by executing each step of the automatically generated help article in the application via an executor, the executor being a software application that runs on the application. Once a step of the help article is executed, method 500 proceeds to determine a current state of the application after executing each step, at 530. Then it is determined that a next step of the automatically generated help article can be executed in the current state of the application, at 535.

Upon determining that the next step can be executed in the current state of the application, method 500 proceeds to execute the next step, at 540. Next, method 500 continues with continuing to with determining the current state of the application after the next step is executed, determining that the next step of the automatically generated help article can be executed in the current state of the application and executing the next step of the automatically generated help article via the executor until each step of the automatically generated help article is executed or an error occurs, at 545, before ending at 550.

Figure 6:
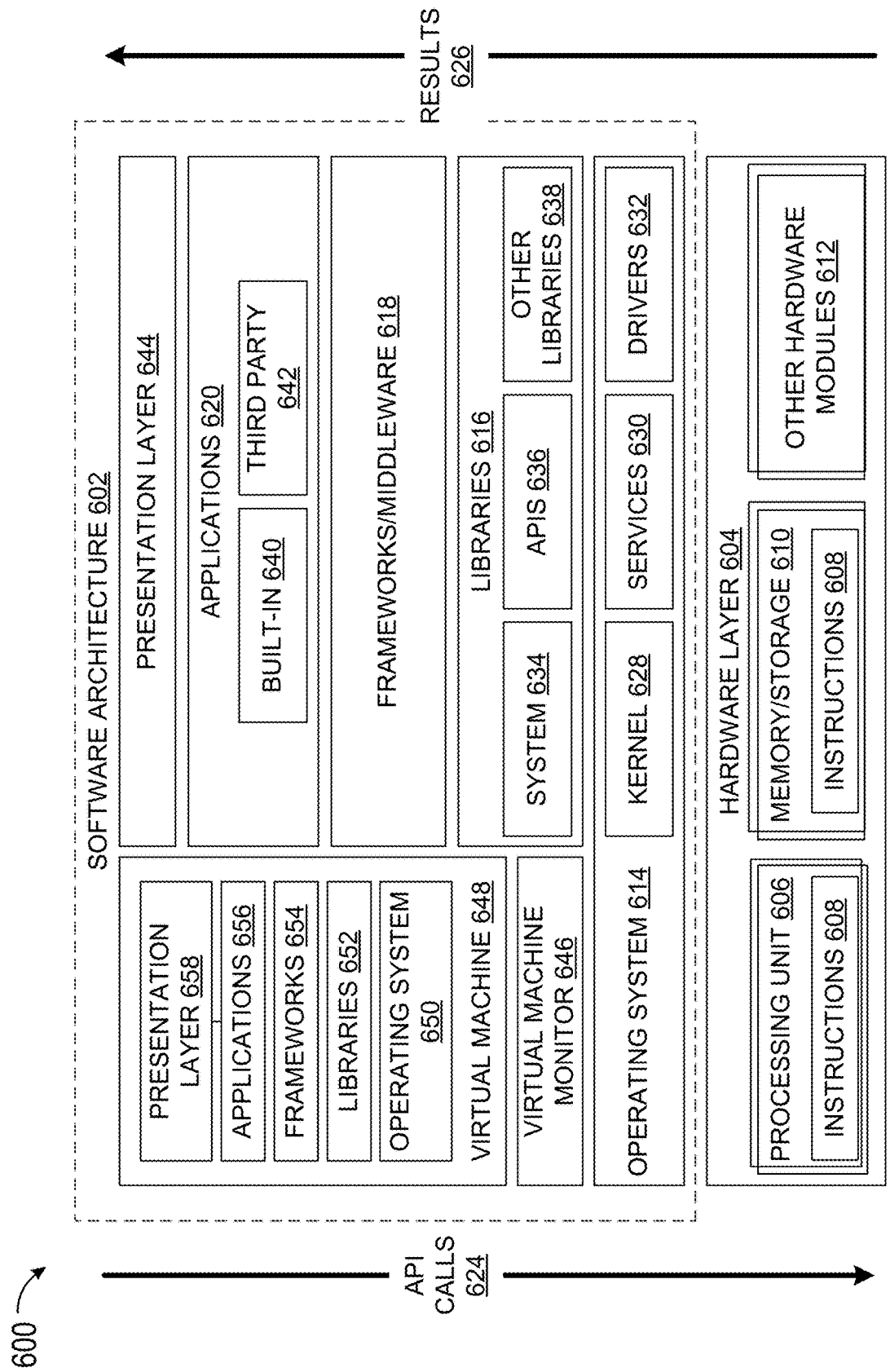
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as client devices, native application providers, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular system. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine depicted in block diagram 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
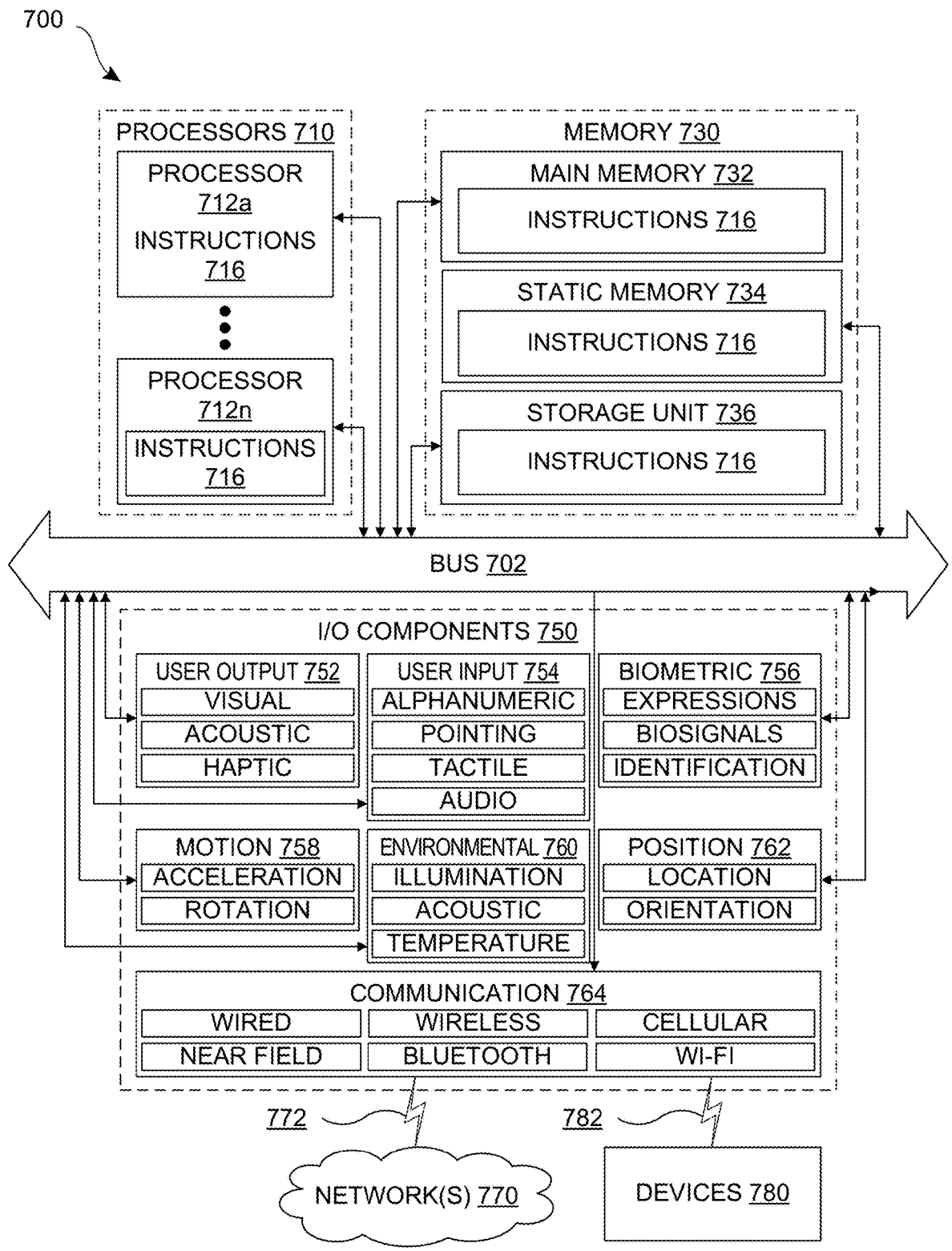
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers). The motion components 758 may include, for example, motion sensors such as acceleration and rotation sensors. The environmental components 760 may include, for example, illumination sensors, acoustic sensors and/or temperature sensors.

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 764 such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-7) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor alone or in combination with other elements, cause the data processing system to perform functions of:
examining application data and a user query for an application, the application data including information about a plurality of user interface (UI) elements available in a UI screen of the application and information about one or more relationships between one or more of the plurality of UI elements, and the user query identifying a functionality of the application for which a help article on how to perform the functionality in the application should be generated;
generating a prompt, using a prompt generating engine, for submission to an artificial intelligence (AI) model, the prompt being generated based on the application data and the user query;
receiving an automatically generated help article on how to perform the functionality in the application from the AI model;
providing the automatically generated help article for at least one of display to a user or validation via simulation,
wherein validation via simulation is performed by:
automatically executing a step of the automatically generated help article in the application via an executor, the executor being a software application that runs on the application;
determining a current state of the application after the step is executed;
determining that a next step of the automatically generated help article can be executed in the current state of the application;
upon determining that the next step of automatically generated help article can be executed in the current state of the application, executing the next step of the automatically generated help article via the executor; and
continuing with determining the current state of the application after the next step is executed, determining that the next step of the automatically generated help article can be executed in the current state of the application and executing the next step of the automatically generated help article via the executor until each step of the automatically generated help article is executed or an error occurs.

2. The data processing system of claim 1, wherein the automatically generated help article is provided for storage in a help content library.

3. The data processing system of claim 1, wherein the AI model is a language model.

4. The data processing system of claim 1, wherein the AI model is a multi-modal language model.

5. The data processing system of claim 4, wherein the application data includes application image data.

6. The data processing system of claim 1, wherein the user query is received from a UI screen associated with a help article generating agent.

7. The data processing system of claim 1, wherein the automatically generated help article includes step by step instructions for performing the functionality in the application.

8. The data processing system of claim 1, wherein the user query is received from an end-user and the automatically generated help article is generated in real-time for display to the end-user.

9. The data processing system of claim 1, wherein the executable instructions, when executed by the processor, further cause the data processing system to perform functions of:
receiving feedback regarding validation of the automatically generated help article when an error occurs during validation;
generating a revised prompt based on the application data, user query and the feedback; and
providing the revised prompt to the AI model to generate a revised automatically generated help article based on the feedback.

10. A method for automatically generating help content for a functionality of an application comprising:
examining application data and a user query, the application data including information about a plurality of user interface (UI) elements available in a UI screen of the application and information about one or more relationships between one or more of the plurality of UI elements, the user query identifying the functionality;
generating a prompt, using a prompt generating engine, for submission to an artificial intelligence (AI) model, the prompt being generated based on the application data and the user query;
receiving an automatically generated help article on how to perform the functionality in the application from the AI model;
simulating the automatically generated help article in the application by executing each step of the automatically generated help article in the application via an executor, the executor being a software application that runs on the application;
determining a current state of the application after each step is executed;
determining that a next step of the automatically generated help article can be executed in the current state of the application;
upon determining that the next step of the automatically generated help article can be executed in the current state of the application, executing the next step of the automatically generated help article via the executor; and
continuing with determining the current state of the application after the next step is executed, determining that the next step of the automatically generated help article can be executed in the current state of the application and executing the next step of the automatically generated help article via the executor until each step of the automatically generated help article is executed or an error occurs.

11. The method of claim 10, wherein the automatically generated help article is provided for display to a user.

12. The method of claim 10, wherein the user is able to perform at least one of approving the automatically generated help article, revising the automatically generated help article or submitting the automatically generated help article for validation.

13. The method of claim 10, wherein the user query is received from an end-user and the automatically generated help article is generated in real-time for display to the end-user.

14. The method of claim 10, wherein the AI model is a multi-modal language model.

15. The method of claim 14, wherein the automatically generated help article includes visual elements.

16. The method of claim 10, wherein the automatically generated help article includes step by step instructions for performing the functionality in the application.

17. The method of claim 10, further comprising:
receiving feedback regarding validation of the automatically generated help article when an error occurs during validation;
generating a revised prompt based on the application data, user query and the feedback; and
providing the revised prompt to the AI model to generate a revised automatically generated help article based on the feedback.

18. A non-transitory computer readable medium on which are stored instructions that, when executed, cause a programmable device to perform functions of:
receiving a help article for validation, the help article including step by step instructions for performing a functionality in an application;
simulating performance of the help article in the application using an executor software application running on the application by:
executing a step of the help article in the application via the executor;
determining that the step was performed successfully;
displaying information about the step on a user interface screen;
determining a current state of the application after the step is executed;
determining that a next step of the help article can be executed in the current state of the application;
upon determining that the next step of help article can be executed in the current state of the application, executing the next step of the help article via the executor and displaying information about the next step on the user interface screen; and
continuing with determining the current state of the application after the next step is executed, determining that the next step of the help article can be executed in the current state of the application and executing the next step of the help article via the executor until each step of the help article is executed or an error occurs.

19. The non-transitory computer readable medium of claim 18, wherein the information about the step includes information on success or failure of the step.

20. The non-transitory computer readable medium of claim 18, wherein information about the error is transmitted to an artificial intelligence model to generate a revised help article based on the error.

\* \* \* \* \*